W. E. BOLES.
CASING FOR AUTOMOBILE SIGNAL LIGHTS.
APPLICATION FILED OCT. 2, 1919.
1,373,945.
Patented Apr. 5, 1921.
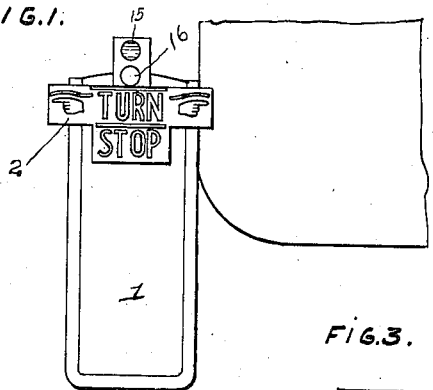
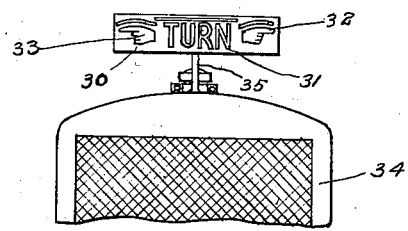
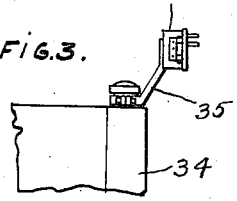
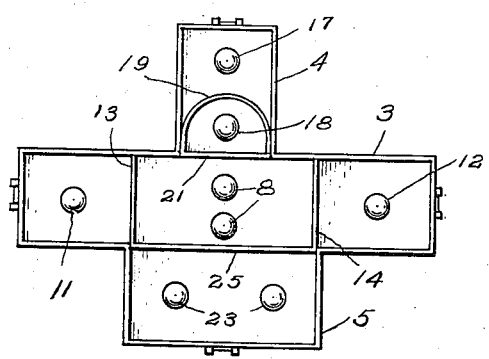
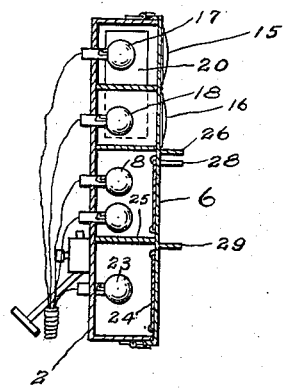
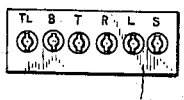
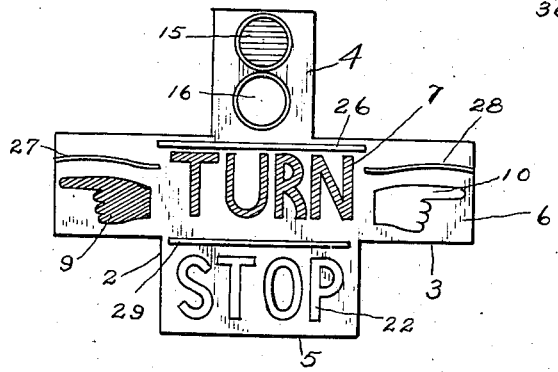
INVENTOR.
WILEY E. BOLES
BY *Carey S. Frye*
ATTORNEY.

UNITED STATES PATENT OFFICE.

WILEY E. BOLES, OF INDIANAPOLIS, INDIANA.

CASING FOR AUTOMOBILE SIGNAL-LIGHTS.

1,373,945.  Specification of Letters Patent.  Patented Apr. 5, 1921.

Application filed October 2, 1919. Serial No. 328,043.

*To all whom it may concern:*

Be it known that I, WILEY E. BOLES, a citizen of the United States, residing at Indianapolis, Marion county, Indiana, have invented certain new and useful Improvements in Casings for Automobile Signal-Lights, of which the following is a specification.

This invention relates to signal lights for automobiles and one feature of the invention is the provision of a structure which will instantly indicate the direction in which the automobile is to travel in making a turn, that is to say, to the right or left.

A further feature of the invention is the arrangement of a direction indicator at both the front and rear end of the automobile which will operate in unison for indicating a right or left turn.

A further feature of the invention is in so constructing the casing for the reception of the signal lights that said casing may be stamped from metal as is also the door for the casing, thereby materially reducing the cost of production and at the same time increasing the strength and durability of the structure.

A further feature of the invention is the provision of stencil openings through the door of the casing arranged to produce different signs and characters, the signal lights showing through said stencil openings and illuminating the same, the interior of the casing having partitions therein for dividing the interior of the casing into compartments and preventing the illumination from one light showing through the stencil openings registering with the adjacent compartment.

A further feature of the invention is the provision, in connection with the rear signaling mechanism, of a tail light compartment and a light to be used when the car is being run backward for giving a plain light in the rear of the car, the side walls of the compartment containing the tail light having transparent walls and a curved partition being inserted between the tail light and the plain light.

In the accompanying drawings which are made a part of this application,

Figure 1 is a rear elevation of an automobile showing the signal light mechanism attached to the mud guard.

Fig. 2 is an elevation of a part of a radiator with the front signal light attached thereto.

Fig. 3 is an edge elevation thereof.

Fig. 4 is an elevation of the rear light containing housing with the door removed.

Fig. 5 is a transverse sectional view through the rear signal light.

Fig. 6 is a front elevation of the rear light mechanism showing the tail light and left turn signal illuminated.

Fig. 7 is an elevation of the switch for controlling the signal lights.

Referring to the drawings in which similar reference numerals designate corresponding parts throughout the several views, 1 indicates the rear fender of an automobile to which is secured a rear signal light mechanism comprising a casing 2, which is preferably stamped from one piece of metal and consists of a central body portion 3, an upwardly extending portion 4, and a downwardly extending portion 5.

One face of the casing 2 is open and fitting over said open side is a door 6 also preferably formed of one piece and shaped to fit the outline of the casing, that portion of the door covering the body portion 3 having stencil openings 7 through the central portion thereof, forming letters which spell the word "Turn," through which rays of light from the lamps 8 within the casing will show, when the lamps are energized.

At the opposite ends of the word "Turn" are openings representing hands 9 and 10, the hand 9 having the index finger pointing to the left and the hand 10 having the index finger pointing to the right, so that when the rays of light from the lamp 11 in the rear of the hand 9 is illuminated, as indicated in Fig. 6 of the drawing, it will signify that the car will turn to the left from the direction in which it is traveling, and by simultaneously illuminating the lamps 8, it will indicate beyond a doubt why the hand 9 is illuminated.

If it is desired to turn to the right, the hand 10, together with the word "Turn" are illuminated and owing to the prominence of the word and hand, the attention of any one in the rear will be readily attracted to the signal light and positive information is given as to the intention of the driver to change his course of travel.

In order to prevent the rays of light from the lamps 8 from showing through the openings representing the hands 9 and 10, and likewise the light from the lamps 11 and 12, associated with these hands, from illuminating the "Turn" sign, partitions 13 and 14 are placed between the lamps 11 and 8 and 12 and 8, respectively, said partitions dividing the body portion 3 into separated compartments.

That portion of the cover 6 projecting over the extension 4 has two openings 15 and 16 therethrough, the opening 15 having a red glass therein to serve as a tail light, as is customary, while the opening 16, positioned immediately below the opening 15, has a plain lense therein, to serve as a back up light, or throw a ray of light a distance in the rear of the machine, each glass having a lamp 17 and 18 respectively, in the rear thereof. A shield 19 is positioned between the lamps 17 and 18 and in order for the rays of light from lamp 17 to pass through the windows 20 at each side of the extension 4, said shield is formed substantially semi-circular over the lamp 18, the lower portion 21 thereof extending in a straight line to form a partition between the lamp 18 and the lamps 8. The rays of light passing through the windows 20 are used for illuminating objects at the sides of the extension 4.

That portion of the door covering the extension 5 has openings therethrough which form letters 22, said letters forming the word "Stop" and in the rear of the word are placed lamps 23, and a strip 24 of transparent material, preferably glass, and this glass is preferably colored red to make it distinctive from the other lights of the signal. The compartment containing the lamps 23 is separated from the compartment having the lamps 8 by a partition 25, which is preferably integral with the partitions 13 and 14.

To render the different signs perfectly visible during the day, shields 26, 27, 28 and 29 are placed above the letters 7, the hands 9 and 10 and the letters 22, respectively which shields extend outwardly from the face of the door 6, to prevent the sun's rays striking directly on these parts thus giving sufficient shadow to render the signs perfectly visible, when the lamps are illuminated, at all times.

To render the Turn sign visible from the front end of the automobile as well as the rear end thereof, a casing 30 is provided at the forward end of the car, similar in outline to the body portion 3, and having openings 31 through the front face thereof forming letters, these letters forming the word "Turn", and at opposed ends of the word are hand forming openings 32 and 33 respectively, to indicate in which direction the machine is to travel when the turn is made. Shields are also positioned above these signs for shading them for rendering them visible in day light.

The casing 30 is preferably attached to the neck of the filler opening of the radiator 34 by a bracket 35, said bracket being so arranged as to prominently position the signal where it can be readily seen by any one forwardly of the machine. The lamps (not shown) in the casing 30 are wired in series with the lamps in the body portion 3 so that said lamps will be illuminated in unison, thus giving the same sign at both ends of the car.

In order to place the lamps under ready control of the driver of the automobile, a number of switches are attached to a convenient part of the machine, preferably the dash, each switch being properly labeled as shown in Fig. 7, the plate 36 having characters above each switch button to indicate what light or lights will be illuminated by turning each button, the button marked "TL" controlling the tail light, "B" the back up light, "T" the Turn signs at both ends of the car, "R" the right hand turn sign, "L" the left hand turn sign, and "S" the Stop sign.

By assembling the parts of the signal mechanism in the manner shown, a very compact structure will be produced and one that will be very strong and durable, and owing to the manner in which the parts of the casing and its door are formed, it can be produced at a minimum expense.

It will further be seen that by providing the word "Turn" in connection with the hand signs, no mistake need be made as to the intentions of the driver to turn the car either to the right or left, and likewise, by providing the shields over the respective signs they will be equally visible at all times when the lamps are illuminated in the sign.

The invention claimed is:

1. A signal casing including an elongated hollow body having a central compartment and separate compartments at the ends thereof of the same height and of less length than the central compartment, hollow sections extending upwardly and downwardly from the body portion, a partition having a horizontal portion for separating the lower section from the central compartment and integral vertical sections for separating the central compartment from the two end compartments, an additional partition for separating the upwardly extending section from the central compartment, lamps in the individual compartments formed by said partitions, and a single door covering one face of all of said compartments and removably secured in position, said door having signal indicating openings therethrough.

2. A signal casing including a horizontally disposed hollow body having an elongated central compartment for coöperation with a word forming signal and a smaller compartment at each end of the central compartment and in the same horizontal plane therewith for coöperation with sign indicating signals, said body having a downwardly extending compartment of equal length with the central compartment for cooperation with a word forming signal and a smaller upwardly extending compartment for coöperation with a tail light forming opening, partitions for separating and excluding the light in one compartment from the other compartments, a door covering one face of all of said compartments, said door having a word forming opening therethrough for registration with each of the central compartment and downwardly extending compartment and hand forming openings at each end of and in the same horizontal plane with the word forming opening registering with the central compartment and positioned over the smaller compartments at the ends of the central compartment, said door also having an opening in registration with the upwardly extending compartment for forming a tail light, and luminaries in the various compartments for illuminating said word and sign indicating openings, one or the other of the hand indicating openings being illuminated simultaneously with the word forming opening in registration with the central compartment.

3. A signal casing including a hollow member, partitions for dividing said hollow member into a central compartment, said central compartment being subdivided into end compartments and an upper and lower compartment, each compartment being separate from the other compartments, a single cover for all of said compartments, said cover having openings therethrough forming the word Turn in registration with the central compartment and openings forming the word Stop registering with the lower compartment, said cover also having an opening in registration with each end compartment forming an outline of a direction indicating hand in horizontal alinement with and at each end of the word Turn, one or the other of which is illuminated simultaneously with the illumination of the word Turn for indicating by word and sign when a turn is to be made to the right or left, said cover also having a tail light opening in registration with the upper compartment, and means for illuminating the various compartments and the openings in registration therewith.

In testimony whereof I hereunto affix my signature.

WILEY E. BOLES.